2,952,573

CARBIDE COATED TUNGSTEN ELECTRODE

Maurice L. Torti, Jr., Lincoln, Mass., assignor to National Research Corporation, Cambridge, Mass., a corporation of Massachusetts No Drawing. Filed May 31, 1957, Ser. No. 662,565

3 Claims. (Cl. 148—31.5)

This invention relates to the electric arc melting of metals. More specifically this invention relates to the electric arc melting of metals in high vacuum using electrodes which remain intact without appreciable erosion during the arc melting process.

Vacuum melting (i.e. melting at pressure below about 1 mm. Hg abs.) is particularly desirable for the melting of refractory metals in light of the violent reaction that occurs between such melted metals and atmospheric gases and the highly detrimental effect of dissolved gases upon the physical properties of such metals.

Vacuum melting of metals has also been utilized throughout industry as a means of melting metals and removing volatile impurities in the same operation. In the case of metals that react with commercially available crucible materials, levitation melting and electric arc melting are the only known methods of effecting the vacuum melting process. At present levitation melting is only a laboratory procedure.

A commercially successful process for vacuum melting has been developed utilizing an electrode of the "consumable" type. The "consumable" electrode is made of the same metal as that being melted, or is of a metal used to alloy with the other metal being melted. The electric arc conditions maintained between such electrodes and the melt are such that the electrodes are progressively consumed during the arcing, thus adding their mass to the melt. The disadvantages of this process are numerous. However the principal disadvantages is that consumable electrodes are extremely expensive to fabricate.

The common method of inert atmosphere arc melting involves the use of permanent ("non-consumable") electrodes of tungsten as cathodes. The permanent electrode apparatus is simple and efficient. However, no successful "non-consumable" electrode for vacuum use has been made. The metals industry recognizes the great advantages that would enure if the process of "non-consumable" electrode arc melting of metal in vacuum could be utilized. The electrode apparatus would be compact, thus requiring a small vacuum chamber. The electrode would be readily adapted to a wide variety of furnace designs, especially those for casting. A variety of forms of metal including scrap and sponge could easily be melted in skulls. The power utilization would be very efficient.

It has been the accepted opinion of those interested in arc melting that it is impossible to achieve satisfactory results utilizing "non-consumable" electrodes in high vacuum wherein the electrode is the cathode. Those doing research in the arc melting field have often reflected that opinion in technical literature, e.g. "Arc Melting in Vacuum," P. C. Rossin, pp. 12–23, Vacuum Metallurgy (copyright, 1955, by the Electrochemical Society), this article being one of the papers presented at the Vacuum Metallurgy Symposium of the Electrothermics and Metallurgy Division of the Electrochemical Society, 1954.

The literature reveals that the "non-consumable" electrodes when used in vacuum are actually consumed, i.e. the electrodes become overheated and melt or otherwise disintegrate, thus requiring the replacement of the electrodes during the melting operation. Some improvement of the process had been realized by drastically cooling the electrode, but the added cost of providing suitable cooling has made the apparatus impractical as compared to the "consumable electrode" process. A further detracting feature of drastically cooled electrodes, where water is utilized as the coolant, is the danger of failure of the system, resulting in water directly entering the melting chamber and reacting violently with the melt.

Those attempting to utilize "non-consumable" electrodes in vacuum melting have found another objectionable feature in utilizing the electrodes known to them: that of unstable arcs. Arc stability is necessary to maintain an even, efficient melting process.

The object of this invention is to provide an electrode which can be utilized successfully as a "non-consumable" electrode in a high vacuum arc-melting process. By high vacuum is meant a pressure less than about 1 mm. Hg abs.

Another object of this invention is to provide a material which can be utilized as a "non-consumable" electrode to produce a highly stable and efficient arc in a high vacuum electric arc-melting process.

Another object of the invention is to provide a method of preparing electrodes for use in high vacuum arc melting.

Other objects of the invention will in part be obvious and will in part appear hereinafter.

The invention accordingly comprises the process involving the several steps and the relation and the order of one or more of such steps with respect to each of the others and the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description.

It is known that intense electric arcs are required for arc melting. To achieve this high intensity current a voltage is impressed across an electrode and the melt. The current produced is dependent upon the "electron" emissivity of the material utilized as the cathode. The emissivity of a given material varies as a function of temperature. In general arc melting, i.e. melting in the presence of a substantial partial pressure of gas, at temperatures within its mechanical strength range, tungsten has sufficient emissivity to produce arcs of adequate intensity and stability for the melting operation.

In vacuum operation greater emissivity is required to stabilize the much larger arc which is characteristic of the vacuum arcing.

Using pure tungsten electrodes in high vacuum, pressures below 1 mm. Hg abs. produce results consistent with those indicated by Rossin in his article, "Arc Melting in Vacuum." In that article he includes a series of photographs depicting the disintegration of the tungsten cathodes. Moreover, a stable arc was not achieved.

It has been postulated that the cause of this disintegration is a result of ion bombardment of the cathode, the emission of electrons from the tungsten cathode being insufficient to neutralize the positive ions produced in the melting operation. This bombardment heats the cathode to extreme temperature which produces the disintegration. Regardless of the accuracy of the postulation, it has been experimentally determined that with the use of material of greater emissivity as a non-consumable cathode, the cathode operates at lower temperatures. Examples of such materials of high electron emission are thorium, and alkali metals and alkaline earth metals such as barium, strontium, calcium and the like. It has been found that thoriated tungsten, e.g. tungsten with an added constituent of thorium oxide, produced a cathode of higher emissivity, sufficient to create a stable arc. The temperature of operation with the electrode was within the range of about 2500 to 3000° K. and pressures below 1 mm. Hg abs. with resultant current intensity of at least 50 amp./cm.$^2$. Pressures as low as 5 microns Hg abs. did not disturb the arc. This emissivity of the electrode is thought to result from the reduction of the thoria of the electrode to thorium and transport of the thorium by diffusion to the surface of the electrode, with electron emission resulting from the thorium.

Through the results obtained with the thoriated electrode were favorable, they could not be consistently reproduced. It was noted that the high temperature of operation and the high vacuum enhanced the evaporation of the highly emissive material, thus making it difficult to maintain a layer of the emissive material on the surface of the electrode to increase its emissivity.

The objects of this invention were realized when it was discovered that treatment of the thoriated electrode at temperatures in the range of 1500° to 3500° K. while in intimate contact with a carburizing substance produced a non-consumable electrode which could be operated as a cathode in high vacuum in the temperature range of 2500° to 3000° K. with consistently stable arcs of intensity above 50 amp./cm.$^2$.

Theoretically it appears that carbon unites with the surface material of the electrode forming carbides with the tungsten and thorium, or at least a loose association between those elements whereby the evaporation rate of the thorium is reduced, thus making it possible to maintain a thin layer of the thorium on the surface.

Many methods of treating the electrode with a carburizing substance are feasible. One preferred method is that of coating the electrode with a colloidal suspension of carbon, and arcing the thus coated electrode to heat it sufficiently for the reaction to take place. Another preferred method is that of packing the thoriated electrode in loose carbon and heating it.

It has been found that the complex carbon stratum that is produced is not of a completely permanent nature, and for best results the electrode should be re-carburized after a few hours of operation. This re-carburizing can be performed by the use of another preferred method of carburizing. The electrode is placed in its fixture in the furnace in which it is to be used for arc melting. An atmosphere of a gaseous hydrocarbon such as acetylene in mixture with an inert gas such as argon is admitted to the furnace. A voltage is then impressed between the electrode and a grounded blank inserted in the furnace to create an arc of sufficient intensity to heat the electrode sufficiently to create the desired chemical reaction with the carbonaceous gas. Equally, this subsequent carburizing can be effected by painting the electrode with the colloidal suspension of carbon and arcing in the furnace.

Though the rate of evaporation of the thorium is thus reduced, yet some of the thorium is lost during the operation. For this reason it is readily seen that the useful life of the electrode is dependent upon the amount of thoria therein contained. Thus, though a presence of thoria near the surface of the electrode would be sufficient to maintain adequate operation for a while, it is desirable to include throughout the electrode a distribution of thoria in a maximum amount consistent with the required strength characteristics of the electrode. Thus, for an electrode of ¾ inch diameter and 3 inch length, utilized in a bolted holding device, it was found that 2 percent by weight of thoria could be included in the makeup of the electrode without impairing the strength characteristics thereof.

For proper operation it is necessary to maintain a monatomic layer of thorium on the surface of the electrode. The minimum amount of dispersed thoria required to produce this monatomic layer on the electrode is dependent upon the diffusion characteristics of the tungsten. Amounts of thoria on the order of 2 percent are preferred since this appears to provide adequate thoria for long electrode life without appreciable affecting the physical characteristics of the electrode. While considerably lesser amounts of thoria can be employed, the life of the electrode will be correspondingly decreased.

Since certain changes may be made in the above process and apparatus without departing from the scope of the invention herein involved, it is intended that all matter contained in the above description shall be interpreted as illustrative and not in a limiting sense.

What is claimed is:

1. An arc melting electrode in a vacuum furnace in which the melting condition requires an arc of a density of at least 50 amps./cm.$^2$, which electrode is made of a mixture of tungsten and a material having electron emission characteristics substantially greater than that of tungsten at temperatures in the range of about 2500° to 3000° K., said electrode having provided on the surface thereof a thin heat resistant layer of a carbide which acts as an inhibitor against the evaporation of the material having high electron emission characteristics.

2. A non-consumable arc melting electrode in a high vacuum arc melting furnace, said electrode comprising tungsten and thorium dioxide and having a surface stratum comprising a carbide of a metal selected from the group consisting of thorium and tungsten.

3. The electrode in claim 2 wherein the thorium dioxide is present in a quantity on the order of 2 percent by weight of the electrode.

References Cited in the file of this patent

UNITED STATES PATENTS

| | | |
|---|---|---|
| 2,400,893 | Thurber et al. | May 28, 1946 |
| 2,658,844 | Harbaugh | Nov. 10, 1953 |
| 2,789,152 | Ham et al. | Apr. 16, 1957 |

OTHER REFERENCES

Metals Handbook, 1948 Edition, by American Society for Metals. Pages 686–688.